March 28, 1939.     H. CANTONI     2,152,240
STORAGE BATTERY VENTING MEANS
Filed Oct. 22, 1934
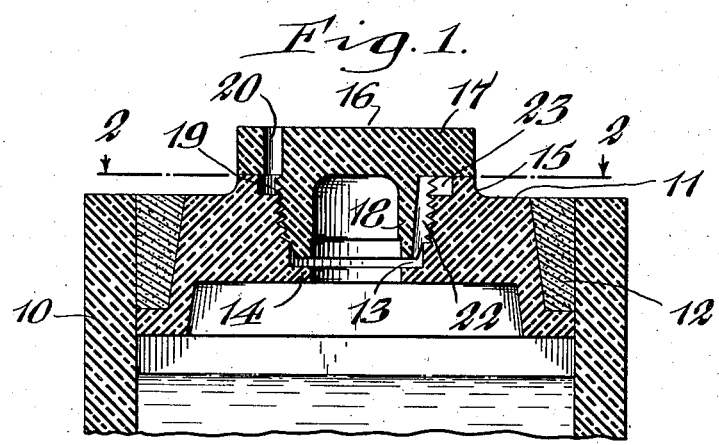
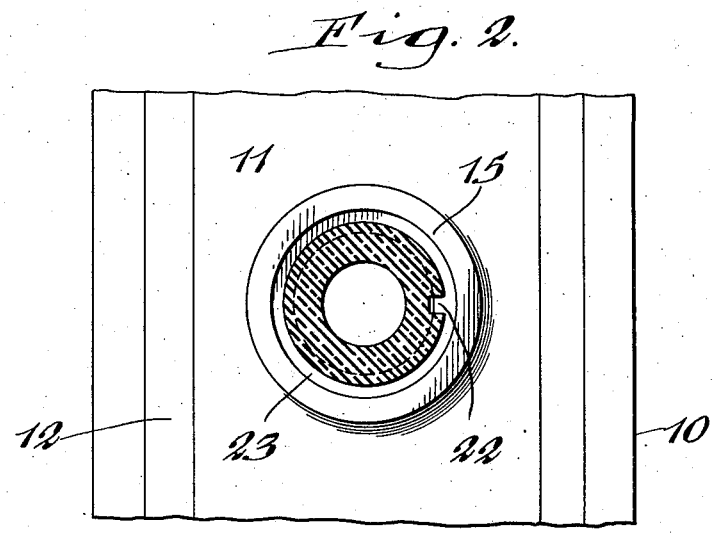
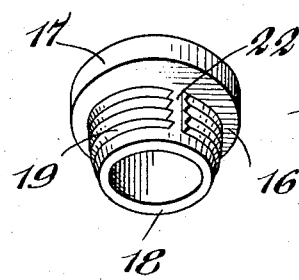
INVENTOR
Humbert Cantoni
BY
ATTORNEY Patented Mar. 28, 1939

2,152,240

UNITED STATES PATENT OFFICE 2,152,240

STORAGE BATTERY VENTING MEANS

Humbert Cantoni, Paris, France, assignor to U S L Battery Corporation, Niagara Falls, N. Y., a corporation of New York Application October 22, 1934, Serial No. 749,384

5 Claims. (Cl. 136—177)

The present invention relates to storage battery construction and more particularly to a novel means for venting storage battery cells.

It is well known that a secondary battery cell must be provided with means to permit of the egress of gases formed in the cell during its normal operation. It is also well known that it is desirable to remove from the escaping gases any electrolyte which may be entrained therein to prevent the short circuiting of the battery and corrosion of the metal parts on the exterior thereof. The present invention resides principally in the provision of an improved means for accomplishing these results which, because of extreme simplicity of design and construction, may be manufactured conveniently and economically and which may be readily secured in operating position.

A better understanding of the invention may be had by reference to the annexed drawing wherein:

Figure 1 is a sectional elevational view of a portion of a storage battery cell embodying one form of the invention.

Figure 2 is a top plan view, partially in section, taken on the line 2—2 of Figure 1.

Figure 3 is a perspective view of one form of the improved vent plug.

Referring to the drawing, reference numeral 10 indicates generally a storage battery cell having a cover 11 which is sealed in the usual manner by sealing compound 12 to prevent the escape of electrolyte from the cell. Cover 11 is provided with a filling aperture 13 which is threaded for a portion of its length. Adjacent its lower end aperture 13 is reduced in size to provide an annular ledge 14. Integrally formed on the upper surface of cover 11 is a boss 15 which is concentric with aperture 13 and spaced a short distance therefrom.

Aperture 13 is adapted to be closed by a specially constructed vent plug, indicated by the numeral 16, and which will now be described in detail. The plug consists of an annular top portion 17, having a depending integrally formed skirt 18 of reduced diameter. The outer surface of said skirt is provided with screw threads 19. Portion 17 is apertured as indicated by 20, and at a point preferably diametrically opposite said aperture threads 19 are split or broken to form a vertical slot 22.

The parts are so proportioned that when the plug is secured in position by engagement of screw threads 19 with those formed in the wall of aperture 13 the under surface of the outer portion of member 17 is brought into contact with the upper surface of boss 15 and caused to bear tightly thereagainst. Skirt 18 is of such length that its lower end terminates a short distance above ledge 14.

Looking at Figure 1 it will be noted that with the vent plug in position in the cell cover an annular groove or passage way 23 is formed between boss 15 and skirt 18 which is completely closed with the exceptions of slot 22 which affords access thereto from the interior of cell 10, and aperture 20 which extends therefrom to the atmosphere.

The operation of my device will now be readily apparent. Gases formed during the operation of the cell escape from the interior thereof through slot 22 to passageway 23, and from passageway 23 through aperture 20 to the atmosphere. Passageway 23 constitutes in effect a condensing chamber. Any moisture entrained in the escaping gases condenses therein and drains back into the cell.

As the escaping gases are in a substantially dry condition when they reach the atmosphere, the possibility of the battery being short-circuited, and of the links and posts becoming corroded, by electrolyte escaping through the vent is reduced to a minimum.

The use of my venting arrangement obviates the necessity of employing baffles and other parts frequently used in connection with vent plugs, thereby simplifying its manufacture. Its manufacture is further simplified by reason of the fact that the condensing chamber is positioned without the confines of skirt 18 rather than being formed by reducing the outside diameter of said skirt at a point intermediate its ends to provide a horizontal groove extending completely around the skirt, as has been heretofore proposed.

The cell may be readily sealed for shipping purposes by placing a sealing disc of soft rubber or other suitable material on ledge 14, which disc, obviously, would be held in position by the lower end of skirt 18.

In the foregoing I have described one form of my invention. Many modifications will occur to those skilled in the art. It is the intent that this patent shall cover all such modifications as fall within the scope of the appended claims.

Having duly described my invention, I claim:

1. Venting means for storage battery cells comprising a cell cover having a filling aperture therein and having a boss concentric with and spaced from said aperture, a vent plug having a depending skirt portion of reduced diameter in contact with the wall of said aperture and having an enlarged top portion resting on said boss to form an enclosed condensing chamber above the upper surface of said cover, a portion of the outer surface of said skirt portion being slotted to permit the egress of gases from the interior of said cell to said condensing chamber, and another portion of said vent plug being provided with an aperture in direct communication with said chamber to permit said gases to escape directly from said condensing chamber to the atmosphere, said last named aperture and said slot being out of register with each other.

2. Venting means for storage battery cells comprising a cell cover having a filling aperture therein, a boss concentric with and spaced from said aperture, a vent plug having an enlarged top portion in contact with the upper surface of said boss to form an enclosed condensing chamber, and a reduced skirt portion engaging the wall of said aperture, the outer surface of said skirt being slotted to permit the escape of gases from said cell to said condensing chamber, said enlarged top portion being provided with an aperture in direct communication with said chamber and out of registry with said slot to permit said gases to escape directly from said condensing chamber to the atmosphere.

3. Venting means for storage battery cells comprising a cell cover having an aperture and having a boss concentric with and spaced from said aperture, a vent plug having an enlarged overhanging top portion in tight engagement with said boss to form an enclosed condensing chamber, and a reducing portion engaging the wall of said aperture, the outer surface of said skirt portion being slotted to permit the escape of gases from said cell to said condensing chamber, said enlarged top portion being provided with an aperture in direct communication with said chamber and out of registry with said slot to permit said gases to escape directly from said condensing chamber to the atmosphere.

4. In combination with a storage battery cell cover having a filling aperture therein, and having a boss on its upper surface concentric with and spaced from said aperture, a vent plug engaging the wall of said aperture to close the same and having an enlarged top portion in contact with said boss which, in conjunction with said boss and said cover, forms a condensing chamber, said vent plug having means affording communication from the interior of said cell to said condensing chamber and means out of registry with said first named means affording communication from said condensing chamber directly to the atmosphere, said condensing chamber being completely closed except for said communicating means.

5. In combination with a storage battery cell cover having a filling aperture therein and having a boss formed on its upper surface concentric with and spaced from said aperture, a vent plug having a reduced depending skirt portion engaging the walls of said aperture to close the same, and an enlarged top portion engaging said boss to form in conjunction with said boss and said cover a condensing chamber, said condensing chamber being positioned above the top of said cover and without the confines of said plug, a portion of the outer surface of said skirt being slotted to permit gases formed in the cell to flow into said condensing chamber between the outer surface of said skirt and said filling aperture wall, and said top portion being provided with a perforation at a point out of registry with the slotted portion of the outer surface of said skirt, said perforation being in direct communication with said chamber to permit egress of said gases from said condensing chamber directly to the atmosphere.

HUMBERT CANTONI.